Aug. 30, 1932.  E. W. TSCHUDI  1,874,658
ELASTIC COUPLING
Filed Sept. 18, 1929   3 Sheets-Sheet 1
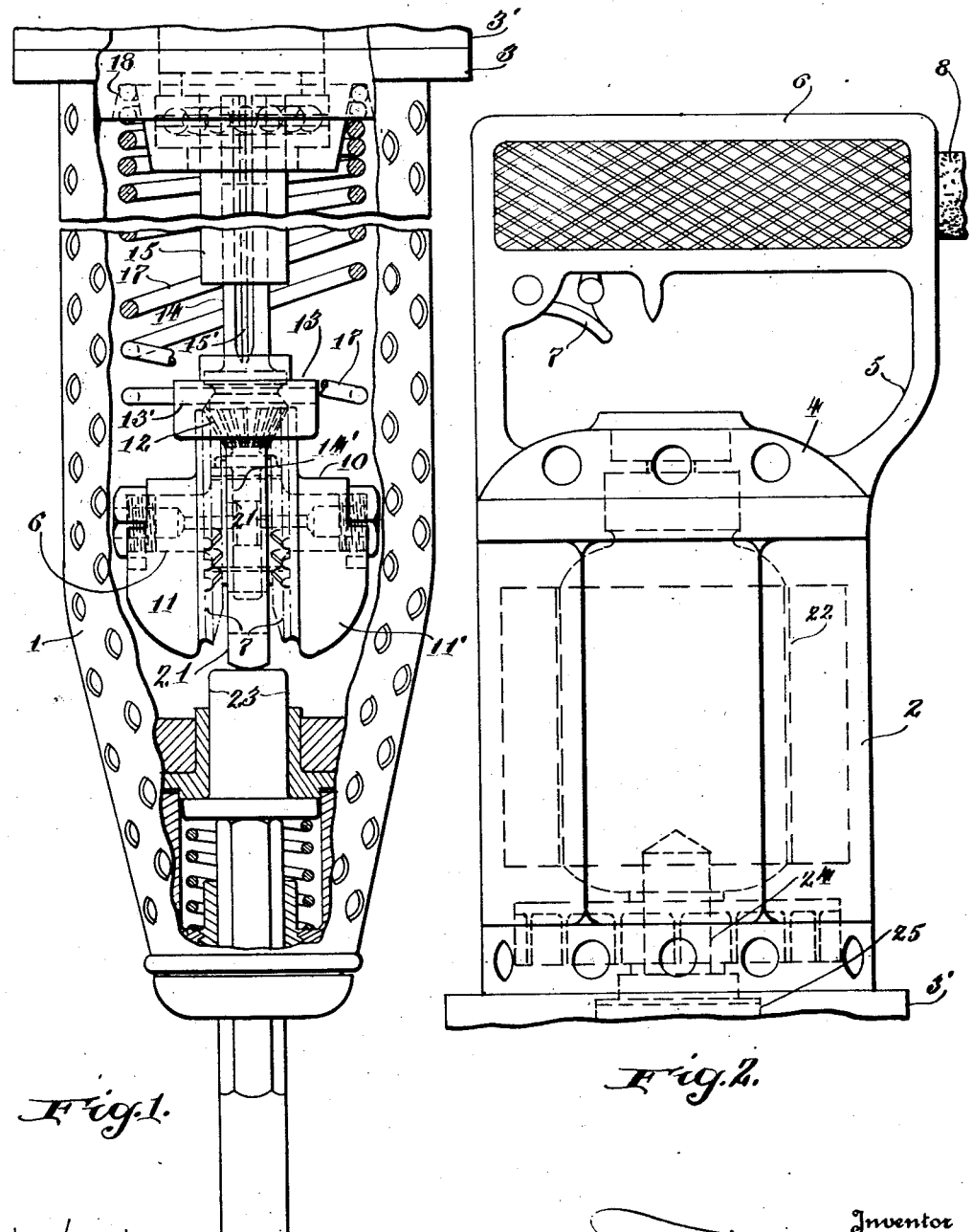

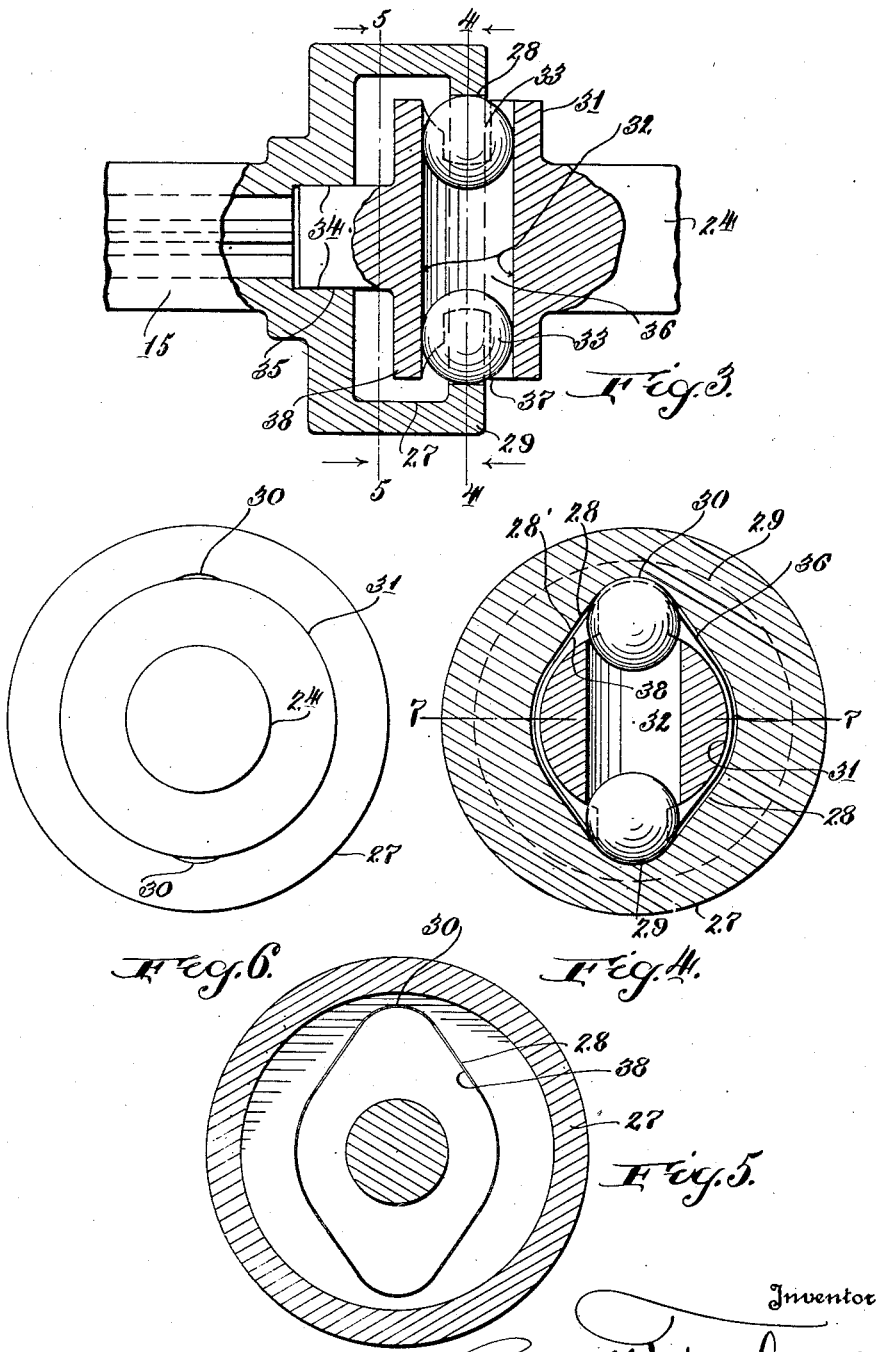

Aug. 30, 1932.  E. W. TSCHUDI  1,874,658
ELASTIC COUPLING
Filed Sept. 18, 1929   3 Sheets-Sheet 3

Inventor
Erwin W. Tschudi
By Edwin Samuels
Attorney

Patented Aug. 30, 1932

1,874,658

UNITED STATES PATENT OFFICE

ERWIN W. TSCHUDI, OF BALTIMORE, MARYLAND, ASSIGNOR TO THE BLACK & DECKER MANUFACTURING COMPANY, OF TOWSON, MARYLAND, A CORPORATION OF MARYLAND

ELASTIC COUPLING

Application filed September 18, 1929. Serial No. 393,547.

The invention relates to an elastic coupling or centrifugal clutch shown in the present instance in connection with a percussive tool or hammer of the portable power driven type. In such tools the shocks to and wear on the motor bearings, couplings, gears, keys, etc., due to the reaction of the hammer blows, is excessive, resulting in a considerable reduction in the life of the machine parts, as compared to the life of the same parts when otherwise employed.

To reduce the harmful effects of the hammering action an elastic coupling or centrifugal clutch has been introduced between the motor and the vibratory weights the oscillation of which produces the hammer blows. The production of such a coupling or clutch is the object of the invention.

In the form of the invention shown the elastic coupling or centrifugal clutch consists of a hollow internal cam member on the driven shaft having an internal cam of varying radius. This cam is engaged by a plurality of balls supported within the cam surface in a substantially diametrical or radial guide way in the driving shaft or driving member so that as the speed of rotation of the shaft and hence the centrifugal tendency of the balls holds them in contact with the cam member and causes them to engage the same, maintaining a temporary connection between the driving and driven shafts. This connection is immediately released when the driven shaft encounters an excessive resistance or back pressure whereby the motor and the entire driving connection are completely relieved of the excessive hammering shocks to which reference has been made. This coupling, being of centrifugal type, may be used as a clutch which operates only when the speed of rotation and hence the centrifugal force, becomes great enough to move the clutch parts and effect an engagement between sections of a shaft which are connected to the respective sides of the clutch.

Described in general terms the device of the invention may be characterized as an elastic coupling or centrifugal clutch consisting of a driving member carrying one or more centrifugal followers mounted to move along a transverse guide carried by the driving member and a driven member having an inwardly disposed cam path cooperating with the centrifugal followers whereby said followers being forced outwardly by the centrifugal action as the driving shaft rotates are caused to engage and impart a corresponding rotary tendency to the cam surface and hence to the driven shaft.

In the accompanying drawings I have illustrated a portable power driven hammer equipped with the elastic centrifugal coupling to which I have referred.

In the drawings:

Figure 1 is a side elevation showing the lower half of a portable power driven hammer to which the coupling of the invention has been applied, the casing being broken away intermediately to expose the underlying parts.

Figure 2 is a corresponding elevation of the upper portion of the hammer, including the grip and motor casing or housing.

Figure 3 is an elevation of the improved form of centrifugal elastic coupling, the same being broken away intermediately to show the underlying parts in section on a vertical plane of the axis.

Figure 4 is a section on the line 4—4 of Figure 3.

Figure 5 is a section on the line 5—5, looking to the right in Figure 3.

Figure 6 is an elevation looking from the right in Figure 3.

Figure 10:
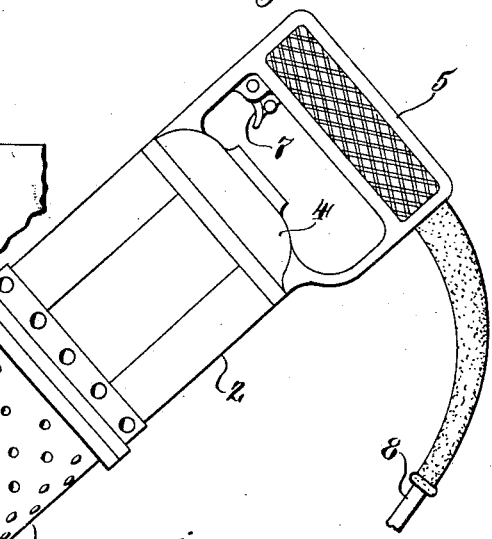
Figure 10 is a perspective view on a reduced scale of the hammer shown in Figures 1 and 2.

Referring to the drawings by numerals, each of which is used to indicate the same or similar parts in the different figures, the construction shown, particularly in Figures 1, 2 and 10, comprises a hammer casing 1, and motor housing 2, secured together with their axes in alignment by means of flanges 3—3' on the adjacent ends of the respective casings. The motor casing 2 has secured to its opposite end a brush housing 4, which is integral with the grip member 5, which encloses as to the grip proper 6, the switch mechanism not shown operated by trigger switch 7 and supplied with electricity by way of the cable 8.

Within the hammer casing is the vibrating member 10 comprising two eccentric weights 11—11', carried by the gears 7, mounted on journals 6, formed on the striker member 21. The gears 7 mesh with and are driven in opposite rotation by a pinion 12 mounted on the sliding shaft 14 which carries and moves with the vibrating member 10 and slides in and through the hollow driven shaft 15.

In addition to the pinion, the shaft 14 carries at its lower end a journal 14' which has a bearing in the center of striker member 21. A spring 17, engages the groove 18 in the stationary member 3 at one end and groove 13' in the striker arm 13 at the other end and tends to keep the vibrator in its lowest position and prevents rotation of said vibrator 10 about the axis of the sliding shaft 14.

The hollow shaft 15, to which sliding shaft 14 is keyed by spline 15', is connected to the armature of the motor 22 by means of a driving shaft 24 and coupling 25 and driven hollow shaft 15, which coupling connects the driving shaft 24 to the hollow driven shaft 15. This coupling is constructed in accordance with and embodies the features of the invention as already outlined, the conditions herein presented requiring the use of an elastic coupling as already outlined.

In the operation of the hammer, the parts are subject to repeated shocks due to the variation in load resulting from the action of the vibrating member 10, as it moves up and down in response to the reciprocating action of eccentric oppositely rotating weights 11 and spring 17. These shocks result both from the reciprocating action of the hammer member, the vibration of the hammer, the rotary shocks due to the operation of eccentric weights 11 and to the contact of striker 21 with the anvil 23. In order to take up and eliminate the harmful results of the shock, the elastic coupling of the invention has been located between the motor and the vibrator as described. This in the preferred arrangement shown connects the driving shaft or member 24 and the driven shaft or member 15. It comprises a chamber or hollow member 27 formed on or secured to the upper end of the driven shaft, 15, said chamber being preferably concentric with the axis of the shaft and having formed in the upper wall of said chamber a suitable opening surrounded by an internal cam surface 28, the upper wall member being indicated by reference character 29.

This chamber 27 preferably rotates about the axis of the driving and driven shafts which are preferably although not necessarily aligned, and the cam surface 28 which surrounds the end of the drive member, is inwardly disposed and of a varying radius, being formed with pockets 30 of the extreme radius of said cam surface and shown as separated by arcs of 180 degrees. The drive shaft 24, or driving member which is connected with the motor, cooperates with the cam surface 28, having a portion 31 which may be enlarged for this purpose, fitting within the internal cam surface 28 as best illustrated in transverse section in Figure 4 and axial radial section, Figure 3. This enlarged portion 31 is formed with a diametrical guide or way 32, in which are located any preferred type of centrifugally operated cam followers 33. In the form of the invention shown, two balls are used for this purpose. While this construction is preferred and probably cheapest, neither the spherical form of follower nor the number of followers is regarded as essential to the operation of the invention. While the way or guide 32 may be slightly varied as to its position, its axis is preferably in alignment with the center of the cam surface 28.

The drive shaft 24 in the form of the invention shown is centered with the driven shaft 15 by means of a projecting stud 34 on the end of the drive shaft 24 beyond the enlarged portion 31, the same being seated in a socket 35, in the driven shaft 15 at the bottom of the chamber 27.

The portion 31 is shown as circumferentially grooved at 36 dividing the portion or member 31 into upper and lower flanges 37 and 38 and to provide a convenient interlock the lower flange 38 is cut away and reduced from the full circular form of the flange 37 to a form best illustrated in Figure 4 which can be described as a rather pointed ellipse slightly smaller than the internal cam surface 28 through which it is passed in assembling the coupling or clutch. In accordance with the preferred construction the bore or transverse guideway 32 has its axis parallel to and in the plane of the axis of the ellipse, said plane also including the axis of rotation of the shafts 15 and 24.

Figure 8:
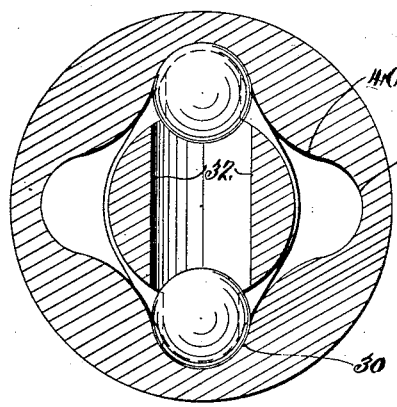
Figure 8 is a section on the line 8—8 of Figure 7, showing a slightly modified form of the coupling or clutch.
Figure 9:
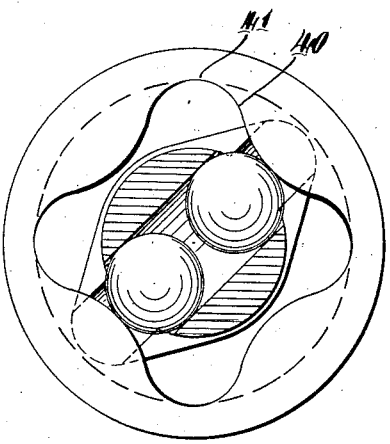
Figure 9 is a section corresponding to Figure 8 showing the driving and driven members angularly displaced forty-five degrees as compared to Figure 8.
Figure 7:
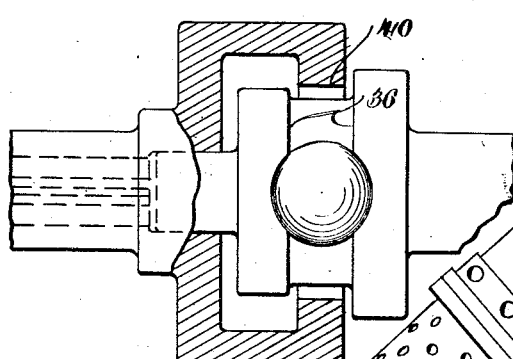
Figure 7 is a section on the line 7—7 of Figure 4, showing the driving member in elevation.

In Figures 7, 8 and 9 I have illustrated a modified form of the device in which the cam surface indicated by reference character 28 in Figures 3, 4, 5 and 6, is varied so that it has four pockets or depressions of maximum radius corresponding to those indicated by reference character 30 in Figures 4 and 5, said cam surface in Figures 7, 8 and 9 being indicated by reference character 40 and said pockets which are in this instance separated by an arc of 90 degrees being indicated by reference character 41. The other elements of the construction not having been varied, the same reference characters are used.

The current being supplied to the motor by way of the cable 8, the trigger switch lever 7 being pressed to make the necessary connection, the torque of the motor and the speed of rotation thereof is communicated to the drive shaft 24, and the speed of rotation of such a motor being well in excess of the critical speed, i. e., the speed which is requisite to throw the balls 33 outwardly by centrifugal force and bring them into contact with the cam surface 28, these balls are thrown outwardly and assuming that the driven shaft 15 is unloaded, they occupy the positions 30 on the cam surface 28 of maximum diameter referred to herein for convenience as pockets.

Assuming that a load be applied to the shaft 15, there will then be at least a momentary angular displacement of the shaft 15 rearwardly, i. e. oppositely to the direction of rotation of the shaft 24 whereby the balls or followers 33 will be forced inwardly against the tendency of centrifugal force, and the angular displacement will increase until a position of equilibrium is reached whereby the centrifugal action of the balls 33 against the face of the cam 28 is just sufficient to balance the counter torque exerted by the driven shaft 15. When the load is suddenly or otherwise increased, the coupling yields and when it is reduced the coupling takes up as just described.

Assuming now that the device as implied is a centrifugal clutch instead of a yielding elastic coupling, and that the drive shaft 24 is started from a position of rest, the balls 33 will be held in contact with the cam 28 by centrifugal force which, due to the small angular velocity of the shaft 24 and the housing 31, will be too small to confine them to the points of greatest diameter, i. e., the pockets 30 and hence they will roll along the periphery of the cam. When, however, the speed of rotation of the drive shaft 24 and the housing 31 has been increased to a point known as the minimum critical value at which speed the balls 33 are held in contact with the cam 28 at its point of greatest diameter, i. e., the pockets 30 in Figures 3 and 4 and the pockets 41 in Figures 8 and 9, the driven shaft 15, together with the chamber 27, will be carried along with and rotated at a speed which is equal to that of the drive shaft 24 and the housing 31.

If, when employed as an elastic clutch or protection against overload, the driven shaft 15 is slowed down because of its overloaded condition and the drive shaft 24 likewise slowed down, a reduced speed of rotation would be reached at which the centrifugal force applied to the balls 33 will be insufficient to meet the increased torque requirement of the driven shaft 15 and the balls 33 will slide or roll within the cam 28 until such a time as the torque requirements of the driven member, including driven shaft 15 and chamber 27, are reduced or the speed of the drive shaft 24 and the housing 31 is increased.

I have thus described specifically and in detail an elastic coupling and centrifugal clutch, the construction embodying the features of my invention in the preferred form in order that the manner of constructing and operating and using the same may be fully understood. However, the specific terms herein are used descriptively rather than in a limiting sense, the scope of the invention being defined in the claims.

What I claim as new and desire to secure by Letters Patent is:

1. In an elastic coupling or centrifugal clutch driving and driven members, the one member having substantially radially disposed ways with balls mounted therein, the other member having an inwardly disposed cam path surrounding the ways and cooperating with said balls, and having portions of increased radius, forming pockets to receive the balls when forced outwardly by centrifugal force, the cam surface having other portions adjacent said pockets of less radius and therefore in close relation to the ways tending to force the balls into the ways as the driving member is rotated relatively to the driven member and providing a yielding tendency in inverse proportion to the speed of rotation, the variation in radius of the inwardly disposed cam path being less than the diameter of the balls so that the balls are prevented from leaving the ways, the balls being otherwise free to roll both in the ways and along the cam path..

2. In an elastic coupling or centrifugal clutch, driving and driven members, balls serving as centrifugal controlling weights adapted to be moved in rotation by the driving member which has peripheral seats for the balls providing for transverse motion of the balls, the driven member having an inwardly disposed path for said balls including pockets of increased radius to receive the balls when forced outwardly by centrifugal force and other portions of a radius closely approaching that of the driven member whereby the balls are forced into the seats when the driven member rotates relatively to the driving member, the centrifugal force serving to hold the balls in the pockets to connect the driving member to the driven member and providing a yielding connection with a torque proportioned to the speed of rotation, the balls being free to roll both in the seats and along the track, the variation in the radius of the track being less than the diameter of the balls whereby their escape from the pockets is prevented.

3. In a centrifugal flexible coupling or centrifugal clutch, driving and driven members, the driving member having a transverse ball race and the driven member having a ball track enclosing the driving member opposite said race, freely rolling centrifugal balls in the race engaging said track and serving to connect the driving to the driven members at a predetermined relation of rotary speed and torque the cam track being of varying radius whereby the balls are permitted to advance beyond the race at certain points in the track and are forced back into the race at other points, the variation in the radius of the track being less than the diameter of the balls preventing their escape from the race.

4. In a centrifugal flexible coupling or centrifugal clutch, driving and driven members, the driving member having a transverse ball race and the driven member having a ball track enclosing the driving member opposite said race centrifugal balls in the race engaging said track and serving to connect the driving to the driven members at a predetermined relation of rotary speed and torque, the track having portions of increased radius forming pockets for the balls, the portions of the track at the sides of the pockets being of less radius and hence approaching closely to the driving member, the variation in radius of the track being less than the diameter of the balls and the latter being free to roll in said race and on said track.

Signed by me at Towson, Baltimore County, Maryland, this 20th day of August, 1929.

ERWIN W. TSCHUDI.